US 8,716,624 B2

(12) United States Patent
Johnson et al.

(10) Patent No.: US 8,716,624 B2
(45) Date of Patent: May 6, 2014

(54) METHOD FOR FORMING TUBULAR BEAM WITH CENTER LEG

(71) Applicant: Shape Corp., Grand Haven, MI (US)

(72) Inventors: Thomas Johnson, Spring Lake, MI (US); Doug Witte, Grand Haven, MI (US); Daniel Gatti, Grand Haven, MI (US); Brian Oxley, Ada, MI (US); Brian Malkowski, Allendale, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 14/051,918

(22) Filed: Oct. 11, 2013

(65) Prior Publication Data

US 2014/0033791 A1   Feb. 6, 2014

Related U.S. Application Data

(60) Continuation of application No. 13/779,310, filed on Feb. 27, 2013, which is a division of application No. 13/228,920, filed on Sep. 9, 2011, now abandoned.

(60) Provisional application No. 61/385,680, filed on Sep. 23, 2010.

(51) Int. Cl.
| | |
|---|---|
| *B23K 26/00* | (2014.01) |
| *B23K 26/08* | (2014.01) |
| *B23K 26/10* | (2006.01) |
| *B23K 37/00* | (2006.01) |
| *B23K 37/04* | (2006.01) |
| *B21D 39/00* | (2006.01) |
| *B21D 9/10* | (2006.01) |
| *B21D 5/14* | (2006.01) |
| *E04C 3/00* | (2006.01) |
| *B60R 19/02* | (2006.01) |
| *B60R 19/04* | (2006.01) |

(52) U.S. Cl.
USPC ............ 219/121.64; 219/121.63; 219/121.76; 219/121.78; 219/121.8; 228/17.5; 228/5.1; 228/49.4; 228/148; 228/158; 72/166; 72/169; 72/170; 72/171; 72/172; 72/173; 52/842; 293/102; 293/155

(58) Field of Classification Search
USPC ........ 219/121.64, 121.63, 121.76; 228/173.1, 228/173.6, 15.1, 17, 44.3, 49.4; 72/166–175; 52/839, 842–846, 851; 293/102, 155
See application file for complete search history.

(56) References Cited

U.S. PATENT DOCUMENTS

| 1,997,876 A | 4/1935 | Sheldon |
| 2,098,989 A * | 11/1937 | Yoder ............................ 228/151 |

(Continued)

FOREIGN PATENT DOCUMENTS

| KR | 10-2010-0003983 | 1/2010 |
| WO | WO 2006056046 A2 * | 6/2006 |

*Primary Examiner* — Dana Ross
*Assistant Examiner* — Gyounghyun Bae
(74) *Attorney, Agent, or Firm* — Price Heneveld LLP

(57) ABSTRACT

A roll former for forming a sheet into a continuous multi-tubular reinforcement beam. The roll former includes a first set of rollers that are configured to bend the sheet to form a common center wall in generally perpendicular orientation relative to first and second lateral portions of the sheet that extend in opposing directions from respective first and second radiused ends of the common center wall. The first set of rollers also form radiused edges on the first and second lateral portions. A second set of rollers is configured to form a channel rib longitudinally along each of the first and second lateral portions. A third set of rollers is configured to bend the first and second lateral portions simultaneously and equally to abut the first and second radiused edges with the respective first and second radiused ends of the common center wall to define adjacent tubes of the beam.

20 Claims, 4 Drawing Sheets

(56) References Cited

U.S. PATENT DOCUMENTS

| | | |
|---|---|---|
| 2,171,540 A | 9/1939 | Calkins et al. |
| 3,452,424 A * | 7/1969 | Morris .......................... 228/147 |
| 3,827,740 A | 8/1974 | Golze et al. |
| 4,267,954 A * | 5/1981 | Smith ........................ 228/173.7 |
| 4,424,652 A * | 1/1984 | Turner ........................ 52/204.2 |
| 4,606,208 A * | 8/1986 | Williamson .................... 72/133 |
| 4,759,487 A * | 7/1988 | Karlinski ..................... 228/17.5 |
| 5,163,225 A * | 11/1992 | Goleby ....................... 29/897.35 |
| 5,186,251 A | 2/1993 | Joshi |
| 5,305,625 A * | 4/1994 | Heinz ............................. 72/132 |
| 5,340,178 A | 8/1994 | Stewart et al. |
| 5,373,679 A * | 12/1994 | Goleby ........................... 52/842 |
| 5,395,036 A * | 3/1995 | Sturrus ........................ 228/146 |
| 5,454,504 A | 10/1995 | Sturrus |
| 5,829,666 A * | 11/1998 | Takeda et al. ................. 228/147 |
| 6,003,912 A | 12/1999 | Schonhoff et al. |
| 6,115,986 A | 9/2000 | Kelly |
| 6,141,935 A | 11/2000 | Artner et al. |
| 6,217,089 B1 | 4/2001 | Goto et al. |
| 6,360,441 B1 * | 3/2002 | Himsl et al. ................. 29/897.2 |
| 6,545,246 B2 * | 4/2003 | Kummle ................. 219/121.63 |
| 6,575,198 B2 * | 6/2003 | Yoshitoshi et al. ............ 138/115 |
| 6,813,920 B2 | 11/2004 | Yoshida et al. |
| 6,814,380 B2 | 11/2004 | Yoshida et al. |
| 6,820,451 B2 * | 11/2004 | Renzzulla et al. ............... 72/173 |
| 6,948,749 B2 * | 9/2005 | Graber .......................... 293/102 |
| 7,108,303 B2 * | 9/2006 | Bladow et al. ................ 293/122 |
| 7,163,241 B2 * | 1/2007 | Liu et al. ....................... 293/102 |
| 7,197,824 B1 * | 4/2007 | Graber ........................ 29/897.2 |
| 7,530,249 B2 * | 5/2009 | Lyons et al. .................... 72/132 |
| RE40,736 E * | 6/2009 | Heatherington et al. ..... 293/102 |
| 7,665,778 B2 * | 2/2010 | Henseleit ...................... 293/102 |
| 7,699,367 B2 * | 4/2010 | Evans et al. ................... 293/120 |
| 7,758,089 B2 | 7/2010 | Lee et al. |
| 7,891,155 B2 | 2/2011 | Surowiecki |
| 8,307,685 B2 | 11/2012 | Heinz et al. |
| 8,333,095 B2 | 12/2012 | Heinz et al. |
| 2004/0130166 A1 * | 7/2004 | Trancart et al. ............... 293/102 |
| 2005/0082346 A1 * | 4/2005 | McNulty et al. ........... 228/173.4 |
| 2005/0285414 A1 * | 12/2005 | Liu et al. ....................... 293/102 |
| 2005/0285416 A1 * | 12/2005 | Heatherington et al. ..... 293/102 |
| 2007/0074556 A1 * | 4/2007 | Heatherington ................ 72/177 |
| 2008/0093867 A1 | 4/2008 | Glasgow et al. |
| 2009/0315346 A1 | 12/2009 | Schelberg et al. |

* cited by examiner

METHOD FOR FORMING TUBULAR BEAM WITH CENTER LEG

CROSS-REFERENCE TO RELATED APPLICATIONS

This application is a continuation of U.S. patent application Ser. No. 13/779,310 filed on Feb. 27, 2013, entitled "APPARATUS FOR MAKING TUBULAR BEAM WITH CENTER LEG." U.S. patent application Ser. No. 13/779,310 is a divisional of U.S. patent application Ser. No. 13/228,920 filed on Sep. 9, 2011, entitled "TUBULAR BEAM WITH SINGLE CENTER LEG," the disclosure of which is incorporated by reference in its entirety. U.S. patent application Ser. No. 13/228,920 claims benefit and priority of provisional Application No. 61/385,680, filed Sep. 23, 2010, entitled "TUBULAR BEAM WITH SINGLE CENTER LEG," the entire contents of which are incorporated herein by reference.

BACKGROUND

The present invention relates to bumper reinforcement beams used in vehicle bumper systems, where the beam is tubular and has a single (mono) center leg. The present invention also relates to roll forming apparatus and methods of forming said beams. However, the present invention is not believed to be limited to only bumper reinforcement beams for vehicles.

Modern vehicle bumper systems typically include a reinforcement beam designed for strength and impact characteristics in order to meet government and insurance industry standards for particular vehicles, but also designed to minimize overall vehicle weight, to maximize strength-to-weight ratios, to fit within confined vehicle package spaces, and to satisfy vehicle aesthetic and functional requirements at front and rear ends of vehicles. Concurrently, the processes and methods of manufacturing the beams preferably minimize undesired product dimensional and quality variations, while also minimizing manufacturing cost, optimizing manufacturability and minimizing scrap. Roll forming processes and methods have proved to be particularly effective at producing high volume runs of bumper reinforcement beams with competitive cost and high dimensional consistency. However, the industry is very competitive, such that even small improvements can be important.

Further, many of the desired features above are conflicting, such that it is not clear how to improve a particular bumper reinforcement beam, or how to improve the roll forming process for making the beam. For example, a heavier beam may be stronger, but would cause an unacceptable increase in vehicle weight. High strength materials may be preferred, but they are expensive, difficult to form, and cause high wear on tooling. Accurate control over positioning of sheet edges during the roll forming process is desired to facilitate an accurate beam cross sectional shape, to reduce tolerances along the edges so that excess material along the edges can be reduced in order to minimize beam weight, and to facilitate consistent contact during welding. However, this can require extra roll forming steps and stations as well as additional tooling, hardware and software controls, each of which increase capital investment and make the roll forming process more complex. The above beams include two sheet edges formed against other material of the sheet, with each being welded by a welder to permanently form the tubular shape of the beams. However, welders take up space along the roll form apparatus, especially where the welders are positioned at different stations along a length of a roll form apparatus, thus increasing floor space requirements considerably, as well as capital investment. Nonetheless, it is difficult to weld in two opposing sides of a beam due to flying debris adversely affecting one or both of the welders. Notably, welds must be consistent and reliable in order to provide reliable and consistent impact strength in the bumper reinforcement beams and in the related bumper systems.

SUMMARY OF THE PRESENT INVENTION

In one aspect of the present invention, rollforming a multi-tubular reinforcement beam for a vehicle includes providing a sheet that includes a generally planar body extending laterally between a first edge and a second edge of the sheet. A roll former includes at least a first set of rollers and a second set of rollers that are configured to sequentially receive the sheet. The sheet is bent with the first set of rollers to form a center wall section in generally perpendicular orientation relative to first and second lateral portions of the sheet that extend in opposing directions from respective first and second ends of the center wall section. The first and second edges of the respective first and second lateral portions of the sheet are bent with the first set of rollers to form a radii. The first and second lateral portions of the sheet are bent simultaneously with the second set of rollers to engage the first edge with the second end of the center wall and the second edge of the second lateral portion with the first end of the center wall to define a first tube and an adjacent second tube. The radii of the first and second edges each contact the center wall section to define a valley for receiving a weld.

In another aspect of the present invention, forming a multi-tubular bumper beam includes a single sheet of steel metal and a roll former. The single sheet is roll formed using the roll former to have adjacent tubes formed on opposite sides of a single common center wall. The roll forming includes forming the center wall to be generally perpendicular to lateral portions of the sheet extending in opposite directions from opposing bent ends of the center wall. A channel rib is formed at a consistent location on each of the lateral portions while using the center wall to maintain a location of the sheet. The lateral portions are formed so that outer edges of the lateral portions abuttingly contact the associated bent ends of the center wall to thus form the adjacent tubes while using the bent ends to assist in maintaining a balanced and symmetrical deformation of the lateral portions. The lateral portions are formed to have coplanar front walls that include the channel rib.

In another aspect of the present invention, a roll former for forming a sheet into a continuous multi-tubular reinforcement beam having four exterior walls that define a rectangular cross-section and a common center wall that extends between opposing outer walls of the exterior walls and divides the rectangular cross-section into adjacent tubes. The roll former includes a first set of rollers that are configured to receive and bend the sheet to form the common center wall in generally perpendicular orientation relative to first and second lateral portions of the sheet that extend in opposing directions from respective first and second radiused ends of the common center wall. The first set of rollers is also configured to form radiused edges on the first and second lateral portions. A second set of rollers is configured to receive the sheet from the first set of rollers and bend the first and second lateral portions simultaneously to form a channel rib longitudinally along each of the first and second lateral portions. A third set of rollers is configured to receive the sheet from the second set of rollers and bend the first and second lateral portions simultaneously and equally to abut the first and second radiused edges with the respective first and second radiused ends of the common center wall to define the adjacent tubes of the beam.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
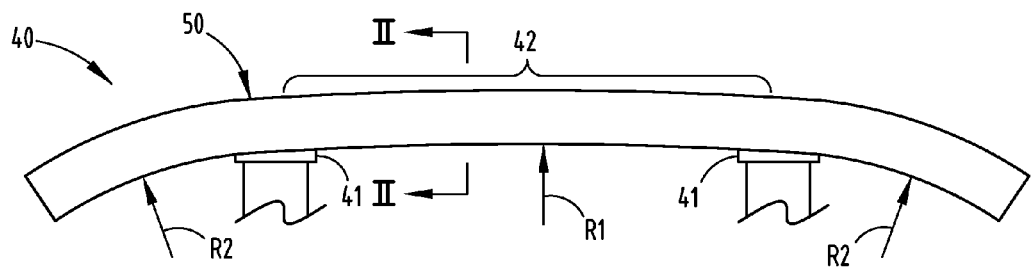
FIG. 1 is a top view of a bumper reinforcement beam that is tubular and includes a single center leg.

A bumper reinforcement beam 40 (FIG. 1) includes a tubular reinforcement beam 50 for a vehicle bumper system, and mounts 41 attached to the beam 50 to facilitate attachment to a vehicle frame, such as for use in a front bumper system (illustrated in FIG. 1) or rear bumper system of a vehicle. The illustrated beam 50 includes a longitudinal center section 42 curved at a first radius R1 and longitudinal outer ends curved at a tighter second radius R2 in order to match an aerodynamic shape of a particular vehicle. However, it is contemplated that the present inventive concepts can be used on any beam, whether linear or swept, and whether consistently curved/swept with a single radius or having different longitudinally-curves ("sweeps").

The present beam 50 is made of sheet steel material having a thickness of 0.8 mm to 1.4 mm and a tensile strength of about 800 to 2000 MPa (i.e. about 120 to 290 ksi). The illustrated beam is about 80 mm high and 40 mm deep (in vehicle-mounted position), with two channel ribs being formed in the beam's front face (one over each tube). Each illustrated channel rib is about 8-10 mm deep and 8-10 mm wide, and includes a rounded bottom. However, it is contemplated that the present beam can be made of different materials, including AHSS (Advanced High Strength Steels) and that it can be made from a sheet having a thickness of about 0.8 mm-3.0 mm thick (or such as 0.8 mm to 1.4 mm thickness), and can be made in different beam cross sectional sizes, such as about 80 mm-150 mm high, and 30 mm-60 mm deep, and having a length equal to or slightly greater than a distance between vehicle mounts/bumper frame rail tips.

Figure 3:
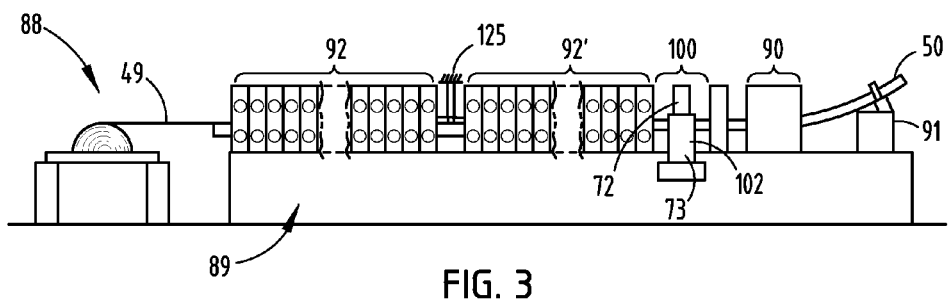
FIG. 3 is a view of the roll forming apparatus for performing the present roll forming process.
Figure 4:
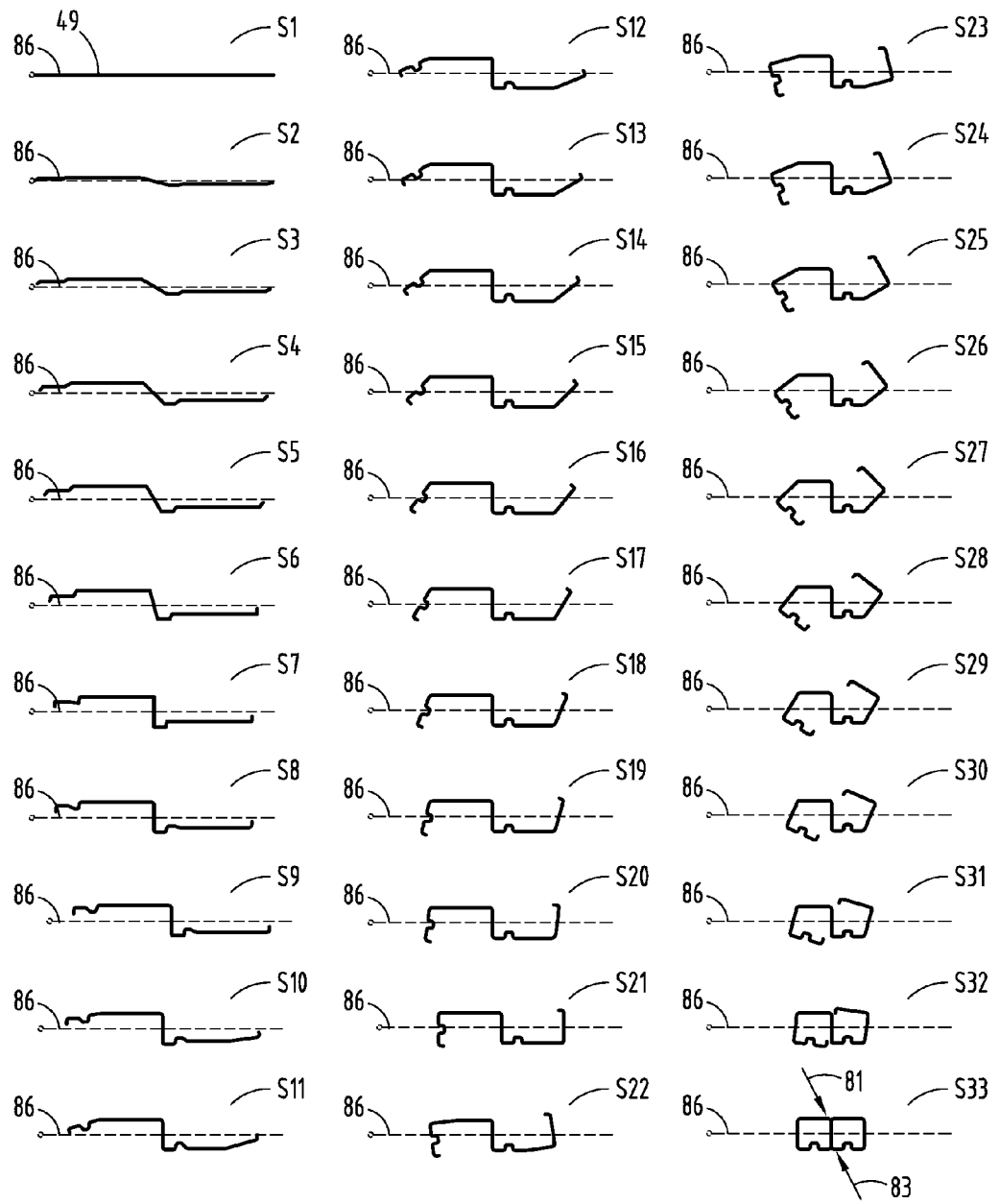
FIG. 4 is a series of cross sections labeled S1-S33 showing a shape of the original sheet at each forming step when forming the beam of FIG. 1.

The present beam 50 (FIG. 3) is formed from a single sheet of steel metal on a roll forming apparatus via a series of paired rolls in roll forming stations, with each station performing a forming operation, such as shown by the roll-formed flower pattern of steps 1-33 in FIG. 4. During the process, a single sheet is formed to have adjacent tubes formed on opposite sides of a single center wall (sometimes called a "mono" wall or "center leg," herein). The roll former includes a first region of forming rolls in stations S1-S7, including forming a center section (i.e. the center wall) with outer sections of the sheet extending outwardly and generally perpendicular to the center wall. Radiused sheet edges are also formed in steps S1-S7. The roll former further includes a second region of forming rolls in stations S8-S33 forming first and second tubes on each side of the center leg and sharing the center leg as a common wall. The channel ribs are substantially formed in steps S8-S12, and help in controlling a lateral position of the sheet as it traverses along the roll form apparatus. Laser welding occurs at or after station S33. Alternatively, the welding can occur in two separate steps, such as in a roll forming process where the first tube is formed halfway through the process (well before the last forming station).

Specifically, as illustrated, slightly less than "half" of the sheet is deformed in a first direction (illustrated as clockwise in FIG. 4) into a first tube with a first radiused edge of the sheet abutted against a radiused end of the center wall (and welded), and an opposite "half" of the sheet is deformed in an opposite second direction (such as counter-clockwise) into a second tube with a second radiused edge abutted against the other radiused end of the center wall (and welded). The line of contact for welding on the first radiused edge is at an end of the radius where a terminal tip of the sheet becomes "flat." Similarly, the line of contact of the radiused end of the center wall is at an end of the center wall where the center wall becomes "flat." However, it is desirable to have the radius be the primary contact so that the laser beam of the welding process has optimal conditions for making a consistent weld. Notably, the welding process includes a laser beam entering the crevice and heating material at the abutting line contact formed by the radiused end and radiused edge. For this reason, it may be desirable that the terminal tips of the sheet edges be formed so that they do not cause a gap at the bottom of the crevice despite process variations, which gap would (could) adversely affect welding, depending on a size of the gap.

Notably, the welding box fixture assists with setting the line contact and with setting a desired abutting pressure for the welding process at the line contact. The mating materials are held abuttingly against each other by the weld fixture shown in FIG. 8, as discussed below, to facilitate a good weld. A radiused shape of the edges allows good contact, yet allows the edges to flex, slide, and bend (caused by forces generated in the weld box fixture), especially along slip plans P1 and P2, allowing the fixture to "set" and maintain a desired cross sectional shape in the weld station. This arrangement facilitates good welding, and potentially decreases the criticality of perfect dimensionality of the edges. Concurrently, the edges of the sheet include a tip section of material inside the beam that extends away from the weld line. As noted above, the free end of the tip section is necessary to assure that there is sufficient material to weld despite material variations along the edge and process variations. However, excess material in the free end of the tip section results in waste and added weight to the bumper beam. By accurately controlling contact and engagement of the edges and abutting material, a length of the "free end" can be minimized, thus reducing an overall weight of the beam to a minimum. It is noted that even ounces of reduced weight can be important to automotive engineers and vehicle designers. The illustrated "free end" is expected to be less than about 4 mm, but it is contemplated that it potentially could be reduced such as to 2 mm, depending on particular process parameters and functional requirements of the beam.

As noted, the radiused edges of the sheet advantageously facilitate and allow for consistent and forgiving abutting engagement as they extend into contact with and are welded to mating radiused (bent) corners on the center leg of the beam. The double radius of the edges and of the center leg ends allows the two sections of material to reliably engage in line contact and engage within a desired range of abutment force, thus better accommodating dimensional variations during the manufacturing process. This configuration facilitates good line contact of the abutting material sections and thus facilitates good welding despite dimensional and process variations. At the same time, the radiused edges and "free ends" of the edges are recessed into the front and rear faces of the beam so that vertical planes defined by the front and rear surfaces of the beam are not uninterrupted by any outwardly-protruding edge of the sheet, which can be important to meeting vehicle manufacturer specifications. Also, the center leg is formed from a center of the sheet (and not from a side edge of the sheet). By forming the center leg first and by making it from a center of the sheet, the roll form process is more balanced and controlled, making it easier to control a lateral position of the sheet. In other words, "wandering" of the sheet in the roll former is reduced due to first forming the center leg, since the center leg then acts as a "center anchor" during later forming of the sheet. This increased accurate positional control of the sheet results in the ability to further reduce tolerances of the "free end" of the edges, since a wide tolerance is not required. It is contemplated that the "free ends" of the edges can be reduced to 4 mm or less, and even as low as 2 mm or less, depending on process controls and characteristics of the sheet and roll forming process.

The tubular reinforcement beam 50 with center leg is particularly suited for use as a reinforcement beam in a vehicle bumper system due to its high strength-to-weight ratio, due to its resistance to longitudinal bending due to an impact inward of its ends, and due to its torsional resistance to rotational forces such as from a vertically-off-center impact.

Figure 6:
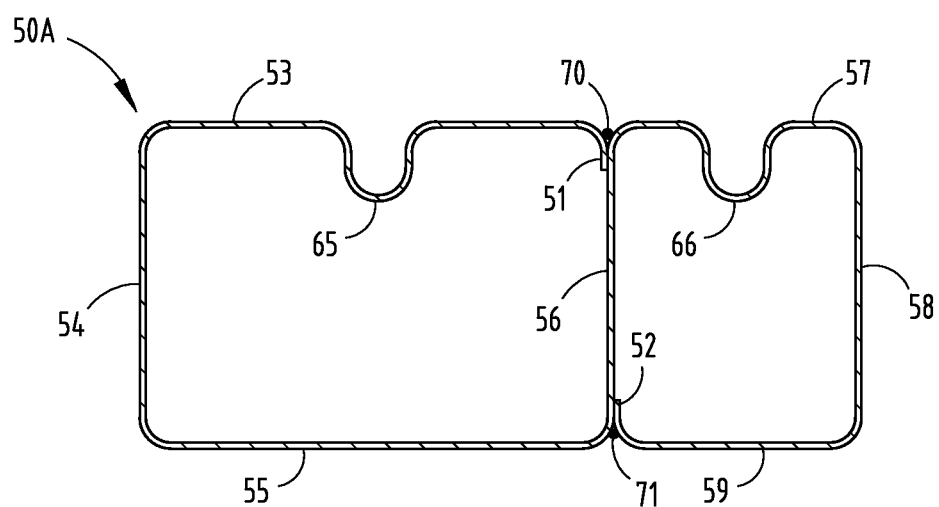
FIG. 6 is a modified beam similar to FIGS. 1-2 but having a modified cross section.

As noted above, the beam 50 (FIG. 2) is formed from a single unitary sheet in a continuous roll forming process (FIG. 6). The beam 50 includes first and second edges 51 and 52 and seven wall sections 53-59 extending sequentially therebetween. The first through fourth wall sections 53-56 form a first tube, and the fourth through seventh wall sections 56-59 form an adjacent second tube, with the wall section 56 being a common shared wall. The wall sections 53-55 and 57-59 combine to form a tubular shape with a center leg formed by horizontally-extending wall section 56 (when in a vehicle-mounted position), and with wall sections 55 and 59 forming a vertical coplanar front face and wall sections 53 and 57 forming a vertical coplanar rear face. The first edge 51 is deformed to form a radius CR1 of about 3-4 mm, with its tip 51' (i.e. "free end" having a length of about 4 mm or potentially as small as 2 mm) extending so that an inner surface 61 of the first edge 51 lies parallel the center wall section 56. The radius CR1 and associated radiused corner 62 (formed by the fourth and fifth wall sections 56-57 on the front face of the beam) engage and are welded to permanently set the first tube.

In beam 50, the second edge 52 is also deformed inwardly to form a radius similar to radius CR1 (such as about 3-4 mm in the illustrated beam), but with its terminal tip 52' extending parallel the center wall section 56. The radius CR1 engages and is welded to an associated radiused corner 64 formed by the fourth and third wall sections 56 and 55. The illustrated beam 50 has a cross section that is generally rectangular, with a center leg dividing the rectangle into adjacent equal-sized first and second tubes. This cross section has been found to provide excellent bending stiffness, torsional stiffness, and a relatively high strength-to-weight ratio.

The illustrated first wall section 53 includes a channel rib 65 (i.e. an inwardly formed depression, also sometimes called a "power rib") that further stiffens the wall section 53 and accordingly stiffens the front face of the beam and stiffens the first tube section. The illustrated channel rib 65 is generally centered along wall section 53 and has a width diameter about 10%-40% of a width of the wall section 53 (or more preferably about 20%-30% of the width) and has a depth about equal to its width diameter. The fifth wall section 57 also includes a channel rib 66 (similar in size, shape, and location to rib 65) that stiffens the wall section 57, and accordingly stiffens the front face of the beam and the second tube section. The radii CR1 formed by the first edge 51 and tip 51A and by the second edge 52 and tip 52A have center points located inside the respective tubes formed thereby. The bottoms of the illustrated channel ribs are semicircularly shape. Nonetheless, it is contemplated that a depth and size of the channel ribs can be made shallow, deeper, wider, narrower, flat-bottomed, or otherwise modified to satisfy specific functional requirements of a beam.

Notably, the radiused shape of the edges 51 and 52 and mating corners cause them to form a crevice rib that also stiffens the beam 50 and thus stabilizes the front and rear walls/faces of the beam 50 in a manner not totally unlike the channel ribs 65 and 66. On the beam's front face, the crevice rib formed by the radiused shape of front edge 51 and associated corner combine with the two channel ribs 65 to effectively form three ribs on a face of the beam 50, each stiffening the bending strength and torsional strength of the beam. Testing has shown that a stiffness of the beam can be increased sufficiently to offset any additional material weight added by virtue of the channel ribs requiring a wider sheet to manufacture the beam. The crevice rib is generally aligned with the center wall, and the cavity it defines is about 3-4 times as deep as a cross sectional thickness of the material of the sheet. Specifically, the cavity of the illustrated crevice rib is about 3-4 mm deep, based on a sheet material thickness of about 0.8 mm-1.2 mm. The laser weld is located at a bottom of the crevice where the material first comes into abutting contact.

Figure 2:
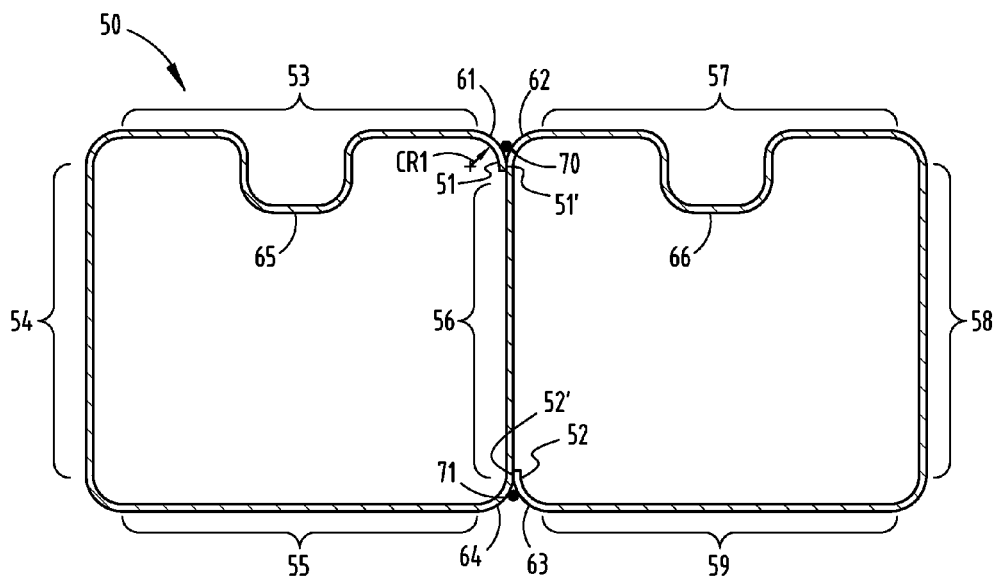
FIG. 2 is a cross sectional view along line II-II in FIG. 1.

It is contemplated that the welds 70 and 71 will be made using laser welders 72 and 73 (FIG. 3). The present welders 72 and 73 are located in a single station S33, which provides significant advantages in terms of space utilization, wiring, and process control. The welds 70 and 71 (FIG. 2) are formed at the outboard abutting material in the crevice, such that the welds are spaced slightly from the terminal ends (i.e. the "free ends") of the first and second edges, such as about 4 mm, or potentially down to about 2 mm. The illustrated curved abutting inter-engagement of sheet material has been found to be forgiving and allows some dimensional variation and dimensional control within the welding fixture without adversely affecting the line contact and the welding operation. Even though the present welders 72 and 73 are located in a single station S33, it is contemplated that they could be located in separate stations along the roll former apparatus if desired or if a particular application requires that.

Notably, the beam, including its cross sectional profile and the welds 70 and 71, are symmetrical. This greatly helps keep the beam uniform and straight (and helps avoid snaking and non-linear bending due to non-balanced weld heats and material shrinkage/movement) during roll forming and manufacturing operations. Persons skilled in the art of roll forming will recognize how balanced the forming process is in each of the steps S1-S33 (FIG. 4). In particular, persons skilled in the art of roll forming manufacture and design will recognize the value of the perpendicularity of the center wall in step S7, and also the value of the perpendicularity of the outer walls in step S21, and the minimization of roll forming steps thereby facilitated.

The related method of manufacturing a tubular reinforcement beam 50 with center wall section 56 for a bumper reinforcement beam 40 (see the roll former in FIG. 3, and the beam in FIGS. 1-2) includes steps of: providing a sheet 49 (see FIG. 3) including first and second edges 51-52 (FIG. 2) and seven wall sections 53-59 extending sequentially therebetween; bending the center wall to a perpendicular orientation to the remaining material (see steps S2-S7), bending the edge tips (step S3-S7) and forming the channel ribs 65, 66 (started in steps S3-S9 and finishing the channel ribs in steps S10-S12), bending the first through fourth wall sections 53-56 to form a first tube and bending the fourth through seventh wall sections 56-59 to form an adjacent second tube (half formed in steps S3-S21 and finishing same in steps S22-S33); welding the first edge 51 to the associated radiused corner 62 and welding the second edge 52 to the associated radiused corner 64 while maintaining an accurate cross sectional shape of the continuous beam in a weld fixture (se FIGS. 7-8); deforming the continuous beam to a longitudinally curved ("swept") shape in the sweeping station, and cutting off the beam segments to length in a cutoff station to form individual bumper reinforcement beams.

Notably, the channel rib 65 in the first wall section 53 and channel rib 66 in the fifth wall section combine with the crevice at a center of the beam front (over the center wall) to provide a three channel rib formation on a face of the beam. This provides excellent bending strength in the beam, as noted above. In particular, testing has shown that channels and ribs providing stability to a face of the beam can improve impact strengths significantly and provide increased consistency of impact strength (and consistency of energy absorbing ability) without increasing beam weight, which is an unexpected and surprising result. The improvement in impact strength is attributed to several factors. For example, the present beam's weight is not increased over a similar sized beam not having channel ribs, because the present beam uses a thinner sheet material while still providing a similar or improved impact test result. Notably, thinner materials can tend to unpredictably/prematurely kink and catastrophically collapse due to the dynamics that occur during an impact against thin sheet material, potentially increasing variability and inconsistency of impact strengths during testing. However, the channel ribs and crevice rib in the front of the present beam helps stabilize the tubular structure of the beam, thus providing improved test results even when a thinner sheet material is used. This improvement was not expected given the fact that the channel ribs and crevice rib are in the face of the beam. Part of the reason it was not expected is because the face-located channel ribs and crevice ribs cause some sheet material to be located inward closer to a bending moment's centerline (rather than farther away from the centerline). Notably, material located closer to a bending moment's centerline contributes less to the beam's bending moment, thus potentially reducing the bending moment of inertia for the beam. However, due to the dynamics of impacts, stability of beam walls can be very important to beam impact performance. Also, some bumper testing causes vertically unbalanced torsional forces (such as when a test impactor device strikes a beam higher than its centerline).

A related apparatus 88 (FIG. 3) for manufacturing a tubular reinforcement beam 50 with center wall section 56 for a bumper reinforcement beam 40 comprises a roll mill 89 with in-line sweep station 90 and cutoff 91. The roll mill 89 includes rolls constructed to form a sheet 49 including first and second edges 51-52 and seven wall sections 53-59 extending sequentially therebetween. The rolls include a first region of roll forming stations 92 with sets of rolls positioned to form the center leg with outer wings of the sheet extending generally perpendicularly from the center leg. The first region of the roll forming stations 92 also forms the radiused edges of the sheet. A second region of roll forming stations 92' include roll sets positioned and configured to bend the first through fourth wall sections 53-56 to form a first tube and to bend the fourth through seventh wall sections 56-59 to form an adjacent second tube, with the single center leg being common to both tubes. First and second welders 72 and 73 are positioned to weld the first edge 51 to the associated inner surface of radiused corner 62, and to weld the second edge 52 to the associated radiused corner 64. The first welder 72 is positioned above the beam, and the second welder 73 is positioned below the beam with its laser beam oriented at an angle, as described below.

It is noted that the present apparatus can utilize a roll mill with horizontal axes supporting forming rolls, or alternatively can utilize a roll mill with vertical axes supporting forming rolls. In the vertical axis mill, the laser welders would potentially operate from opposing sides of the beam or partially above the beam. An advantage of a vertical axis roll mill is that gravity can be used to cause debris and dirt to fall away from the welding sites, since the welder is positioned off to a side and/or above the welding. In the horizontal axis roll mill, the lasers operate from top and bottom positions relative to the beam. The bottom position of one of the welders potentially causes a problem with falling debris, but this problem is solved by the present innovation as discussed below.

As shown by the illustrated version in FIGS. 3 and 4, the apparatus is preferably constructed where both welds are made at a single station with the welding being done simultaneously. One welder 72 is positioned above the welding location and a second welder 73 is positioned below but significantly upstream of (or downstream of) the weld location. The bottom welder is positioned and shielded so that the welder is not detrimentally affected by flying and falling debris. For example, the illustrated bottom welder is located upstream of the actual welding site by 15 degrees from vertical. Also, if necessary (depending on a distance of the laser beam generating device from the weld location), a shield can be used to physically shield the laser generating device from the weld. The illustrated shield is a physical barrier located so that it does not interfere with the laser beam (which defines a line), but so that the laser generating apparatus is protected from falling debris (which tends to define an arc as the debris initially moves laterally and then falls by gravity toward an end of its falling path). It is contemplated that the shield will also include an air shield provided by a directed air stream. Notably, a focal length of a laser welder beam can be up to 36 inches, and the laser beam could be any of several different types, such as gas ($CO_2$), solid state, fiber, or disc.

It is noted that in the steps shown in FIG. 4, the center leg is initially formed from a center of the sheet to a perpendicular orientation relative to a horizontal plane (which extends along a line level of the roll former) in the first few steps S1-S7. This anchors the sheet and keeps the sheet centered in the roll forming process, thus eliminating (or greatly reducing) a tendency of the sheet to wander or slide laterally during the forming process. It is noted that, due to the high strength properties of the present sheet and due to its thickness and width, large lateral forces are generated during the roll forming process. By first forming the center leg to a perpendicular state, control of the sheet's lateral position is much easier and is more inherently controlled/controllable. Also, radii are formed into edges of the sheet in steps S1-S7. Thereafter, the adjacent tubes are formed on opposite sides of the common center leg. As a result in the present process of FIG. 4, the number of roll forming steps can be reduced to as few as 33 steps (see FIG. 4) even when forming a sheet having 290 ksi+ tensile strength, which is considered to be a dramatic and surprising and unexpected improvement from known methods. Notably, fewer forming steps can be very beneficial, since the reduced number of steps can reduce tooling costs (i.e. fewer forming rolls necessary), reduce a length of the roll form apparatus (i.e. fewer roll form stations), and reduce overall processing time (i.e. a shorter cycle time from the initial flat sheet to the double tube beam shape).

Figure 5:
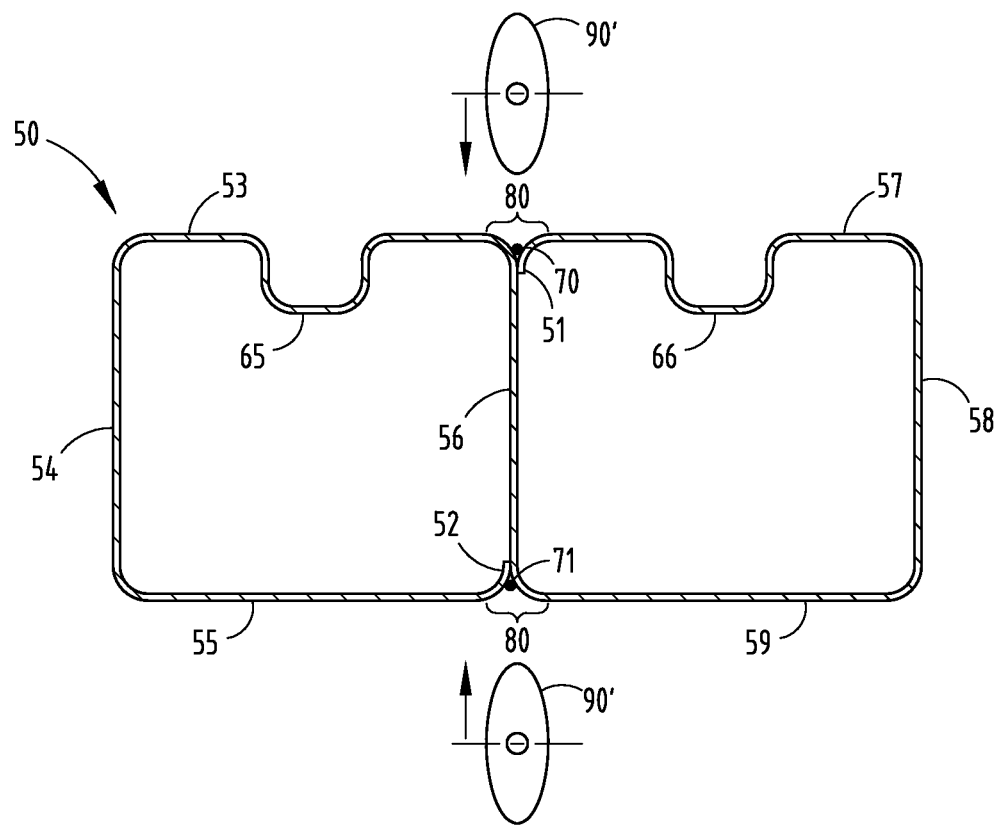
FIG. 5 is a cross section of the beam in FIGS. 1-2 including seam tracking discs forming part of a weld station.

FIG. 5 illustrates a seam tracking disc 90' used to track and control the crevice 80. (In FIG. 5, the disc 90' is exploded away, but it is contemplated that the disc will physically engage the beam 50 and track along the crevice.) The disc 90' tracks a valley of the crevice 80 to facilitate the welding process. Specifically, the disc 90' is a rotating disc, resembling a pizza cutter, that rides inside the area for the continuous weld seam. The laser welder locates off of this disc in the weld valley. As illustrated, a disc 90' can be used to track crevices at both the top and bottom of the beam 50.

FIG. 6 is a cross section of the modified beam 50A similar to FIG. 2 but with the tubes having different widths. Specifically, one tube of beam 50A is about twice a width of the other tube. However, they share a common center wall. Further, they both have a channel rib of similar size and shape, and also there is a crevice rib formed over the center leg. In the beam 50A, similar and identical features, characteristics, and components are identified by using identical numbers but with a letter (such as "A"). This is done to reduce redundant discussion. It will be understood by persons skilled in the art of bumper reinforcement beams and related manufacturing processes that the beam 50A can and does incorporate many features of beam 50, such that an individual discussion of numbers in beam 50A is not believed to be necessary.

Figure 7:
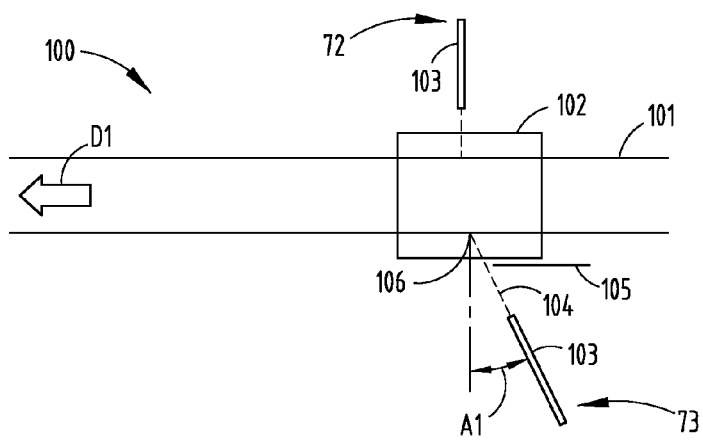
FIG. 7 is a side view showing a welding station near an end of the roll forming process.
Figure 8:
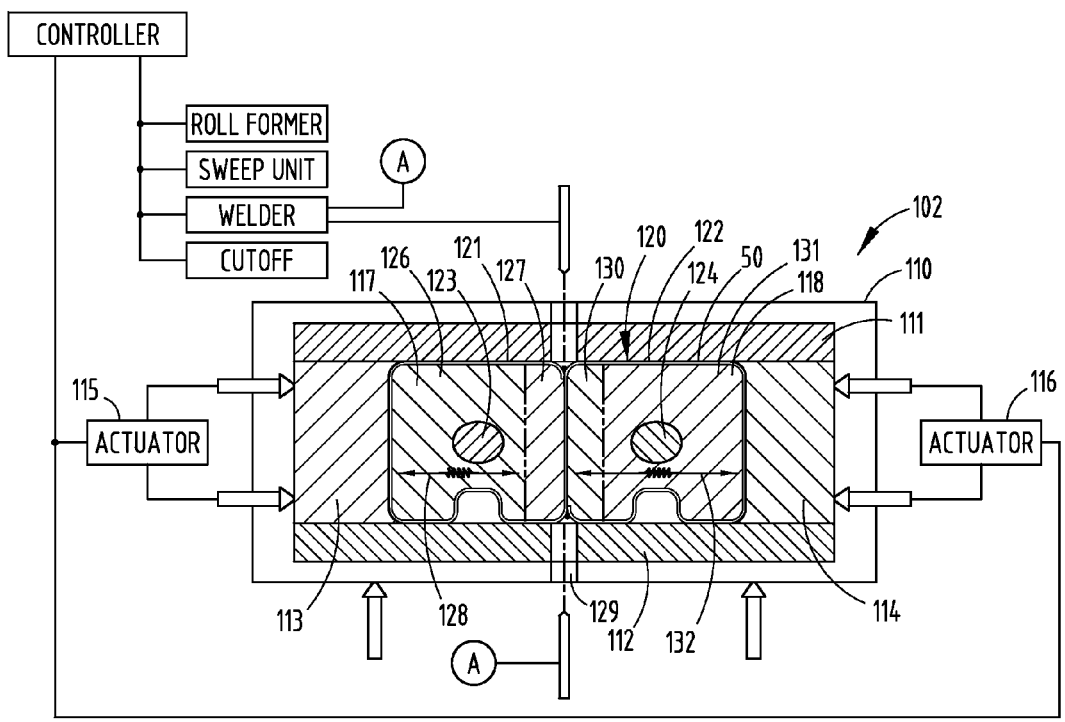
FIG. 8 is a cross section through the welding station of FIG. 7, showing a pressure box fixture for holding the roll-formed beam's final shape during a simultaneous double-weld step.

FIGS. 3, 7-8 show a welding station 100 at an end of and as exiting a roll former. In FIG. 7, the sheet is shown as already having been formed in a roll former, and is traveling in a direction of travel D1. An adjustable weld box fixture 102 is positioned in line with the partially-formed beam 50. Top and bottom laser welders 103 are positioned at the welding station in a location where the weld box fixture will not interfere with their respective laser beams striking targeted abutting material of the beam 50. The bottom laser welder 103 is positioned slightly upstream of the adjustable weld box fixture 102, and its welding laser 104 is oriented at a downstream angle so that the welding laser beam 104 strikes the beam 101 at a desired location to heat and weld abutting material of the beam 101. The laser has a focal length of up to 36 inches, depending on the type of laser. There is no minimum distance of the laser from the weld location on the beam 101. For example, it is contemplated that the laser type could be gas (such as $CO_2$), or could be solid state, fiber, or disc laser types. A maximum angle A1 of the laser 104 to the reinforcement beam 101 is about 15 degrees from vertical (i.e. from perpendicular to a side of the beam 50). A physical shield 105 is used, if necessary or desirable, to shield the laser source 106 from debris from the welding process. The physical shield 105 can be downstream air knives or air jets, or can include a physical panel.

The adjustable weld box fixture 102 (FIG. 8) is located at the welding station and is designed for setting and holding a final shape of the roll-formed beam during the welding step. The illustrated adjustable weld box fixture 102 includes an external steel box frame 110, top and bottom external mandrels 111, 112, and adjustable side external mandrels 113, 114 that are inwardly-pressured by actuators 115, 116. It is contemplated that the actuators can be dynamic or active (such as hydraulic cylinders), or they can be adjustable and passive, such as threaded bolts that can be adjusted to provide a desired amount of inward pressure to maintain a desired shape of the external mandrels within the adjustable weld box fixture 102. Two rods are shown extending from the actuator 115 through the frame 110 to a location where they are attached to the external mandrel 111. However, it is contemplated that alternative connected and motivating arrangements can be constructed.

Internal mandrels 117, 118 are located in each of the tubes 121, 122 of the double tube beam 120, and are anchored by cables 123, 124 that extend to an upstream anchor stanchion 125 located on the roll former where the sheet is laterally open sufficiently to position the anchoring stanchion 125 (FIG. 3) for holding the cables 123, 124 (FIG. 8). It is contemplated that the cables 123, 124 may be replaced by rods or other connection arrangements to position the internal mandrels 117, 118 in the tubes 121, 122. Beam 50 is illustrated, but it is contemplated that the beam could be like beam 50A or another modified beam. The illustrated internal mandrels 117, 118 each are split mandrels with opposing mandrel halves 126, 127 biased apart by a spring 128 (e.g. hydraulic, mechanical, or other spring). Internal mandrel 118 also includes opposing mandrel halves 130, 131 biased apart by hydraulic spring 132. However, it is contemplated that in some circumstances, a one-piece solid internal mandrel can be used on each side. A laser access opening is provided in the fixture box frame 110 and external mandrels 111, 112, with the illustrated laser access opening 129 providing access for the laser beam through a bottom and top of the box frame 110 and through the top and bottom external mandrels 111, 112.

The internal springs 128 and 132 and split internal mandrels 117, 118 in combination with the inward-biasing actuators 115, 116 and external mandrels 113, 114 cause the fixture to maintain a desired outer shape of the beam 101 as it passes through the weld station 100 and is welded. Notably, there is a slip plane P1 defined between the top external mandrel 111 and a top of the side external mandrels 113, 114. Also, there is a slip plane P2 defined between the bottom external mandrel 112 and a bottom of the side external mandrels 113, 114. The slip plane P1 aligns with the front face of the beam 101 and is defined in part by the outboard surface of the tip of the front radiused end of the center leg, and the slip plane P2 aligns with a rear face of the beam 101 and is defined in part by the outboard surface of the tip of the rear radiused end of the center leg. In the welding station, pressure from the internal and external mandrels of the welding fixture cause sheet material to move and deform to an accurate known position along the slip planes P1 and P2. This improves dimensional consistency and accuracy of a cross sectional shape of the beam prior to (and during) the welding process. Also, by this arrangement, the pressure on the abutting surfaces where the welds will occur can be more accurately and consistently controlled for an optimal weld condition.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A method of roll forming a multi-tubular reinforcement beam for a vehicle, comprising:
providing a sheet that includes a generally planar body extending laterally between a first edge and a second edge of the sheet;
providing a roll former that includes at least a first set of rollers and a second set of rollers that are configured to sequentially receive the sheet;
bending the sheet with the first set of rollers to form a center wall section in generally perpendicular orientation relative to first and second lateral portions of the sheet that extend in opposing directions from respective first and second ends of the center wall section;
bending the first and second edges of the respective first and second lateral portions of the sheet with the first set of rollers to form a radius on each of the first and second edges;
bending the first and second lateral portions of the sheet simultaneously in the same rotational direction with the second set of rollers to engage the first edge with the second end of the center wall and the second edge with the first end of the center wall to define a first tube and an adjacent second tube, wherein the radii of the first and second edges each contact the center wall section to define a valley for receiving a weld; and
welding in the valley to attach the first and second edges respectively with the second and first ends of the center wall.

2. The method of claim 1, wherein the first and second lateral portions are each bent with the second set of rollers to form a front wall section, an outer wall section, and a rear wall section that together with the center wall section define the adjacent first and second tubes.

3. The method of claim 2, wherein the front wall sections and the rear wall sections are each substantially coplanar upon engagement of the first and second edges with the center wall, such that the first and second tubes together have a generally rectangular cross section.

4. The method of claim 3, further comprising:
bending the first and second lateral portions of the sheet simultaneously with the second set of rollers to form a channel rib in each of the front wall sections, before the first and second edges engage the center wall.

5. The method of claim 4, wherein the center wall is configured to maintain a balanced roll forming operation through the second set of rollers, such that after formation of the channel ribs, the first and second lateral portions of the sheet are bent equally and simultaneously to form the front, outer, and rear wall sections, such that the first and second tubes have the same size.

6. The method of claim 1, wherein the second set of rollers bend the first and second lateral portions to form a first radiused corner proximate the first end of the center wall section and a second radiused corner proximate the second end of the center wall section, such that the first and second radiused corners form a consistent line of contact with the radii of the first and second edges to further define the valley extending longitudinally along the beam.

7. The method of claim 6, further comprising:
welding the first edge to the second radiused corner and welding the second edge to the first radiused corner at a weld station, while maintaining an accurate and consistent cross sectional shape.

8. The method of claim 7, further comprising:
deforming the first and second tubes to a longitudinally curved swept shape in a sweeping station, and cutting off the first and second tubes to length in a cutoff station to form the individual multi-tubular reinforcement beams.

9. A method of forming a multi-tubular bumper beam comprising:
providing a single sheet of steel metal;
providing a roll former;
roll forming the single sheet using the roll former to have adjacent tubes formed on opposite sides of a single common center wall, wherein the roll forming steps comprise:
forming the center wall to be generally perpendicular to lateral portions of the sheet extending in opposite directions from opposing bent ends of the center wall;
forming a channel rib at a consistent location on each of the lateral portions while using the center wall to maintain a location of the sheet; and
forming the lateral portions by bending the lateral portions simultaneously in the same rotational direction so that outer edges of the lateral portions abuttingly contact the associated bent ends of the center wall to thus form the adjacent tubes while using the bent ends to assist in maintaining a balanced and symmetrical deformation of the lateral portions, wherein the lateral portions are formed to have coplanar front walls that include the channel rib; and
welding the outer edges of the lateral portions to the associated bent ends.

10. The method of claim 9, wherein the lateral portions are each formed to include the front wall, an outer wall, and a rear wall that together with the center wall define the adjacent tubes.

11. The method of claim 10, wherein the rear walls are substantially coplanar and the opposing walls are parallel upon engagement of the outer edges with the center wall, such that the adjacent tubes together have a generally rectangular cross section.

12. The method of claim 9, wherein the first and second lateral portions of the sheet each include less than half of a width of the sheet defined between the first and second edges.

13. The method of claim 9, wherein roll forming the sheet further comprises:
forming a radii at the outer edges of the lateral portions before forming the channel ribs, wherein the radii engage the bent ends of the center wall to define a valley for receiving a weld.

14. The method of claim 13, wherein a portion of the outer edges that extends beyond the valley is minimized to have a length that is less than 4 mm.

15. The method of claim 9, further comprising:
welding the outer edges to the bent ends of the center wall by using a single weld station to place a weld continuously along a valley defined between the bent ends and the outer edges, while maintaining an accurate and consistent cross sectional shape.

16. The method of claim 9, wherein the roll former includes a first set of rollers that receives the sheet for forming the center wall and a second set of rollers that sequentially receives the sheet for first forming the channel ribs and then forming the lateral portions to include the front walls in coplanar alignment, outer walls in parallel alignment, and rear walls in coplanar alignment that together with the center wall define the adjacent tubes having a rectangular cross section.

17. The method of claim 9, further comprising:
deforming the adjacent tubes to a longitudinally curved swept shape in a sweeping station, and cutting off the first and second tubes to length in a cutoff station to form individual multi-tubular bumper beams, wherein the sweeping station is configured to provide the curved swept shape to includes a first radius proximate a longitudinal center section of the beam and a tighter second radius proximate longitudinal end sections of the beam.

18. A roll former for forming a sheet into a continuous multi-tubular reinforcement beam having four exterior walls that define a rectangular cross-section and a common center wall that extends between opposing outer walls of the exterior walls and divides the rectangular cross-section into adjacent tubes, the roll former comprising:
a first set of rollers configured to receive and bend the sheet to form the common center wall in generally perpendicular orientation relative to first and second lateral portions of the sheet that extend in opposing directions from respective first and second radiused ends of the common center wall, and to form radiused edges on the first and second lateral portions;
a second set of rollers configured to receive the sheet from the first set of rollers and bend the first and second lateral portions simultaneously to form a channel rib longitudinally along each of the first and second lateral portions;
a third set of rollers configured to receive the sheet from the second set of rollers and bend the first and second lateral portions simultaneously and equally in the same rotational direction to abut the first and second radiused edges with the respective first and second radiused ends of the common center wall to define the adjacent tubes of the beam; and
a welder for welding the first and second radiused edges with respective first and second radiused ends of the common center wall.

19. The roll former of claim 18, wherein the first and second radiused edges engage the first and second radiused ends of the common center wall to define a valley for receiving a weld continuously therealong from the welder, and wherein the channel ribs are located on coplanar front walls of the adjacent tubes.

20. The roll former of claim 18, further comprising:
a sweeping station configured to receive the adjacent tubes from the third set of rollers and deform the adjacent tubes to a longitudinally curved swept shape that includes a first radius proximate a longitudinal center section of a beam segment and a tighter second radius proximate longitudinal end sections of the beam segment.

* * * * *